US008746097B2

(12) United States Patent
Werner et al.

(10) Patent No.: US 8,746,097 B2
(45) Date of Patent: Jun. 10, 2014

(54) DRIVE TRAIN

(75) Inventors: Olaf Werner, Buehl (DE); Stefan Goppelt, Buehl (DE)

(73) Assignee: Schaeffler Technologies AG & Co KG, Herzogenaurach (DE)

( * ) Notice: Subject to any disclaimer, the term of this patent is extended or adjusted under 35 U.S.C. 154(b) by 640 days.

(21) Appl. No.: 12/766,105

(22) Filed: Apr. 23, 2010

(65) Prior Publication Data

US 2010/0199792 A1 Aug. 12, 2010

Related U.S. Application Data

(63) Continuation of application No. PCT/DE2008/001633, filed on Oct. 2, 2008.

(30) Foreign Application Priority Data

Oct. 25, 2007 (DE) .................... 10 2007 051 065

(51) Int. Cl.
*F16H 3/08* (2006.01)
(52) U.S. Cl.
USPC ........................................................... 74/330
(58) Field of Classification Search
USPC .................................... 74/329, 330, 331, 340
See application file for complete search history.

(56) References Cited

U.S. PATENT DOCUMENTS

| | | | |
|---|---|---|---|
| 5,725,456 A * | 3/1998 | Fischer et al. | 477/174 |
| 5,876,306 A * | 3/1999 | Murata | 477/175 |
| 6,044,931 A | 4/2000 | Reed, Jr. et al. | |
| 6,397,994 B1 * | 6/2002 | Bowen | 192/48.9 |
| 6,634,477 B2 * | 10/2003 | Beneton et al. | 192/48.8 |
| 6,755,089 B2 | 6/2004 | Hirt | |
| 7,426,880 B2 * | 9/2008 | Caenazzo et al. | 74/330 |
| 7,886,887 B2 * | 2/2011 | Bassett et al. | 192/105 CP |
| 7,967,122 B2 * | 6/2011 | Friedmann et al. | 192/48.8 |
| 8,001,863 B2 * | 8/2011 | Patzner | 74/330 |
| 2002/0189393 A1 * | 12/2002 | Tabuchi et al. | 74/573 R |
| 2003/0106767 A1 * | 6/2003 | Beneton et al. | 192/111 A |
| 2008/0188342 A1 | 8/2008 | Jackson | |

FOREIGN PATENT DOCUMENTS

| | | |
|---|---|---|
| DE | 103 05 241 A | 9/2004 |
| EP | 1 369 613 | 12/2003 |
| WO | 2005/008098 A | 1/2005 |

* cited by examiner

*Primary Examiner* — Troy Chambers
*Assistant Examiner* — Jude Agendia
(74) *Attorney, Agent, or Firm* — Lucas & Mercanti, LLP

(57) ABSTRACT

A drive train, which has an internal combustion engine with a crankshaft and a parallel shift transmission with two part drive trains, which each have one transmission input shaft. One shaft is formed as a hollow shaft around the other shaft, and a dual clutch, which is received rotatably on the hollow shaft, is connected to the crankshaft and has two friction clutches and two clutch plates each assigned to one clutch and are each connected to one transmission input shaft. Each clutch plate has a torsional vibration damper with a working range which is smaller than a maximum torque of the engine. A build-up of a combined vibration which has an axial vibration of the dual clutch and a rotational vibration of the drive train during an overlap shift operation is prevented by the design of the torsional vibration dampers for a smaller torque.

5 Claims, 3 Drawing Sheets

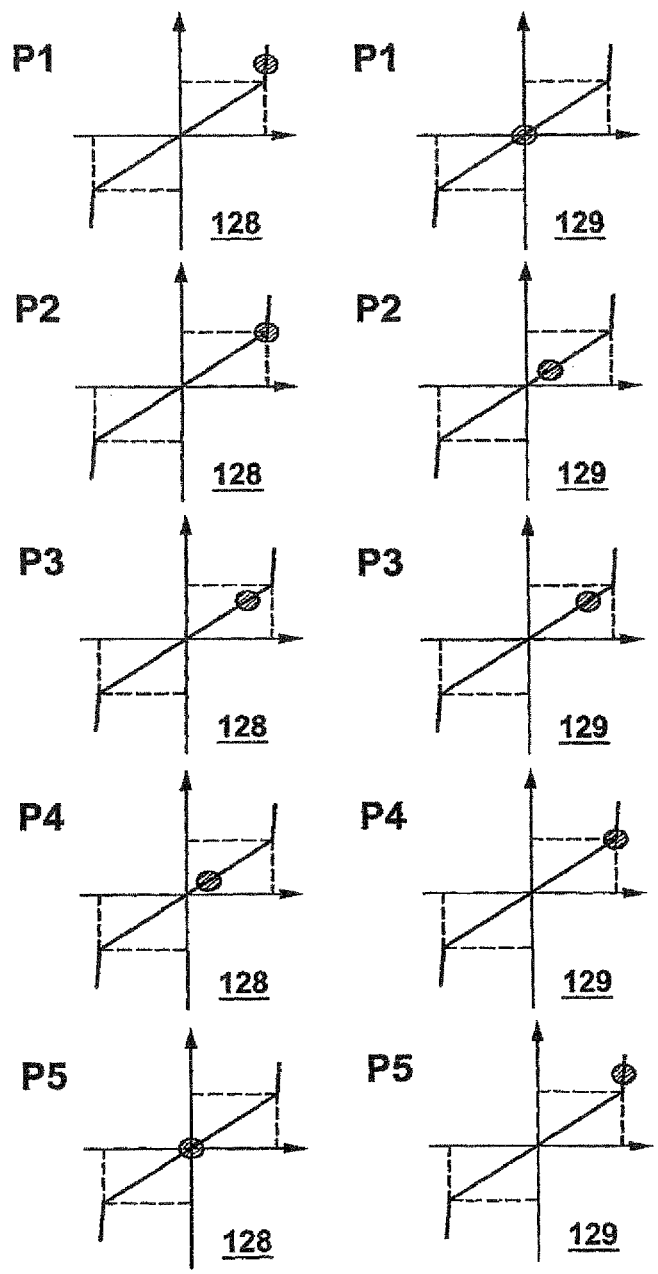

DRIVE TRAIN

This application is a continuation application of PCT/DE2008/001633 filed Oct. 2, 2008, which in turn claims the priority DE 10 2007 051 065.0, filed Oct. 25, 2007, the priority of these applications is hereby claimed and these applications are incorporated by reference herein.

The invention relates to a drive train having an internal combustion engine, a parallel gear-shift transmission with two part drive trains and a dual clutch arranged between the internal combustion engine and parallel gear-shift transmission.

Drive trains having parallel gear-shift transmissions and dual clutches are known. In such drive trains, an internal combustion engine drives, by means of a crankshaft, in each case a part drive train connected to the crankshaft by means of one of two friction clutches of the dual clutch, whereas the other friction clutch is open and a following gear can already be preselected in the associated drive train not connected to the crankshaft. The actual shifting from one gear transmission ratio to the other here takes place by so-called overlapping of the friction clutches in that the closed friction clutch is opened while the open friction clutch is closed and hence the torque transmission from the internal combustion engine is switched from one part drive train to the other without interrupting the drive torque.

The dual clutch is, by virtue of its construction, heavier than a single clutch and, in order to relieve the crankshaft, is preferably rotatably mounted on a transmission input shaft designed as a hollow shaft of a part drive train. The dual clutch is actuated here by actuating units mounted fixedly on the transmission. Furthermore, the transmission input shaft is helically toothed with a transmission output shaft to form individual shiftable gear transmission ratios. Here, as a result of rotary torque fluctuations in the drive train, an axial vibration of the dual clutch can additionally be brought about. Here, due to the rotary torque fluctuation, the transmission input shaft which bears the dual clutch as a hollow shaft is axially accelerated because of the helical toothing, whereby the dual clutch is also axially modulated and a relative movement with respect to the actuating units results and a modulation of the transmissible torque is caused, in particular during an overlapping shifting operation of the friction clutches. This leads to an uncomfortable behavior of the drive train during overlapping switching operations and in particular during shifting operations from an active gear arranged on the transmission input shaft designed as hollow shaft to a new gear to be switched which is arranged on the other transmission input shaft.

It is therefore the object of the invention, in a drive train predetermined by the above-described structures, to propose damping measures which allow a comfortable operation of the drive train in particular during an overlapping shifting operation.

The object is achieved by a drive train having an internal combustion engine with a crankshaft and a parallel gear-shift transmission with two part drive trains with in each case one transmission input shaft, wherein one transmission input shaft is formed as a hollow shaft around the other transmission input shaft, and with a dual clutch which is received rotatably on the hollow shaft, is connected in a rotationally fixed manner to the crankshaft and has two friction clutches and two clutch plates which are assigned to in each case one clutch and are connected in a rotationally fixed manner to in each case one transmission input shaft, wherein each coupling plate has a torsional vibration damper with a working range smaller than a maximum torque of the internal combustion engine.

Here, the torsional vibration dampers used in the clutch plates are intended to serve less for isolating the vibrations of the internal combustion engine—with virtually closed clutches, the torsional vibration damper assigned to this friction clutch is in any case bridged as a result of its smaller torque capacity than that of the internal combustion engine. By virtue of the soft design of the torsional vibration dampers which in total achieve at least the torque capacity but are designed to be individually weaker than the maximum torque of the internal combustion engine, in the case of a bridged, that is to say for example fully compressed torsional vibration damper, the other is situated in its working range and is able through its soft design to damp the rotary vibrations of the associated transmission input shaft and hence the axial vibrations dependent thereon. Since in the parallel shifting transmission the individual gearwheel pairings are kinematically connected to one another via the individual toothed wheel pairings—two gears of different transmission input shafts are simultaneously engaged during an overlapping shifting operation—, the other transmission input shaft is simultaneously also damped. Therefore, during an overlapping shifting operation, the torsional vibration damper of the still active gear is bridged first and is slowly connected via the active friction clutch with decreasing torque to be transmitted. In a slip phase of the two friction clutches with a medium torque transmission, the two torsional vibration dampers operate in their working range and, with a slowly closing friction clutch of the new gear to be activated, the associated torsional vibration damper is slowly bridged and only the other torsional vibration damper is situated with an opening friction clutch in its working range.

It has been shown that designing the working ranges of the torsional vibration dampers arranged in the friction clutches to half of the maximum torque of the internal combustion engines can be advantageous. Thus, advantageous torsional vibration dampers for in each case one transmission input shaft for an internal combustion engine having a maximum torque of 250 Nm can have a working range of in each case 125 Nm, wherein the torsional vibration dampers are advantageously designed in such a way that a stable bridging at a relatively high torque acting on the torsional vibration dampers is possible by means of fully compressible springs or hard or soft stops. Multi-stage characteristic curves may be provided for this purpose. The stiffness of the damper may be 40 Nm for one degree of angle of rotation. It will be understood that the torsional vibration dampers may be correspondingly adapted for other internal combustion engines.

Furthermore, a vibration isolation of the internal combustion engine may be provided by means of a torsional vibration damper, for example in the form of a two-mass flywheel, mounted between the crankshaft and dual clutch. Alternatively or in addition, a slip control may be active over the entire speed of rotation range or over a predetermined speed of rotation portion, this slip control limiting the torque which is transmittable via the friction clutches such that torque peaks of the internal combustion engine are not or only partially transmitted via the friction clutches.

The invention is explained in more detail with reference to FIGS. 1 to 4, in which:

FIG. 4 shows a representation of the division of the working ranges of the two torsional vibration dampers of FIGS. 2 and 3.

Figure 1:
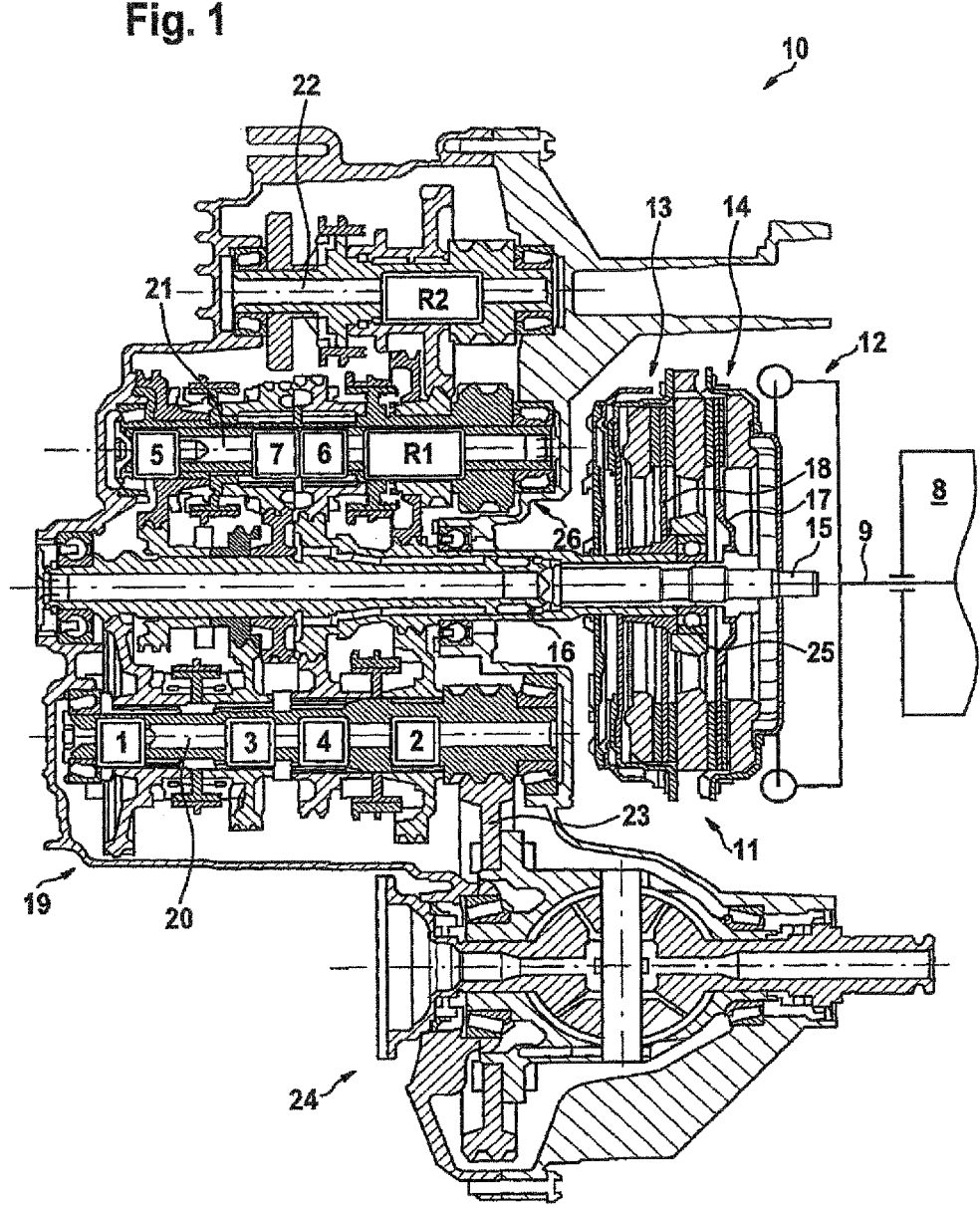
FIG. 1 shows a section through a drive train on which the invention is based.

FIG. 1 shows a drive train 10 with a merely intimated internal combustion engine 8 which is connected in a rotationally fixed manner to the dual clutch 11 by means of a crankshaft 9 via an optionally present—likewise only intimated—two-mass flywheel 12 or another torsional vibration damper for vibration isolation of the rotational irregularities of the internal combustion engine. The dual clutch 11 contains, in a common housing, two friction clutches 13, 14 which frictionally connect the crankshaft 9 to one of the two transmission input shafts 15, 16 in each case during corresponding actuation by an automated actuator. For this purpose, a clutch plate 17, 18 with friction linings which come into interacting frictional contact with corresponding counter-friction surfaces of the friction clutches 13, 14 is connected in a rotationally fixed manner to each transmission input shaft 15, 16. The transmission input shafts 15, 16 which belong to the parallel shifting transmission 19 are toothed with a multi-part output shaft by means of gearwheel pairs for forming the gears 1, 2, 3, 4, 5, 6, 7, R1, wherein in each a case a loose wheel and a fixed wheel, which in each case are arranged on the associated transmission input shaft 15, 16 or on one of the part shafts 20, 21 and mesh with one another by means of a helical toothing, form a gearwheel pair for a gear. Here, the gears 1, 3, 5, 7 are arranged between the transmission input shaft 15 and the part shaft 21, and the gears 2, 4, 6 are arranged between the transmission input shaft 16, which is designed as a hollow shaft and arranged concentrically around the transmission input shaft 15, and the part shaft 20. The reverse gear R1 is formed on these shafts by means of a further part shaft 22 and a pinion R2 for reversing the direction of rotation. With regard to the representation of the parallel shifting transmission 19, it should be noted that the part shafts 21, 22 are projected onto the paper plane but in reality are spatially arranged with the transmission input shafts 15, 16 such that both part shafts 20, 21 are toothed with the toothed wheel 23 of the differential 24.

The dual clutch 11 is rotatably and axially fixably received on the transmission input shaft 16 by means of a bearing, for example the rolling bearing 25 shown. Between a housing wall 26 and actuating levers of the two friction clutches 13, 14, there is provided for each friction clutch 13, 14 an actuator (not shown) for engaging and disengaging the friction clutches 13, 14 which are in each case axially supported on the housing wall 26.

As a result of various torsional vibration sources in the drive train, for example the internal combustion engine, which can pass undamped to a high degree into the parallel shifting mechanism 19 via the transmission input shafts 15, 16 or which, during use of a torsional vibration damper, can pass vibrations of reduced amplitude into the parallel shifting transmission 19 via the transmission input shafts 15, 16, the drive train is caused to experience torsional vibrations which, on meeting eigenfrequency conditions, place components of the drive train in resonance and thus can lead to an unsteady, noise-emitting and/or uncomfortable drive train 10. If torsional vibrations are passed to the transmission input shaft 15, for example during a shifting of a gear 2 arranged on the transmission input shaft 16 to a gear 3 of the other transmission input shaft 15 by means of an overlapping of the two friction clutches 13, 14, the torsional vibration-excited transmission input shaft 15 causes a transmission of the torsional vibrations to the transmission input shaft 16 via the helically toothed gearwheel pairs and part shafts 20, 21. By means of the axial force component occurring on the spur toothings during a rotational movement, the transmission input shaft 16 is also excited axially to produce vibrations, with the result that the friction clutches 13, 14 vibrate with respect to their actuator arranged fixedly on the housing and cause a modulation of the friction clutches 13, 14 operated in slip during an overlapping shifting operation. This leads to a modulation of the transmitted torque and can lead to resonance and noise disturbances. By means of a torsional vibration damper already provided in the drive train 10, for example by means of the two-mass flywheel 12, torsional vibrations of the internal combustion engine 8 can be damped.

Figure 2:
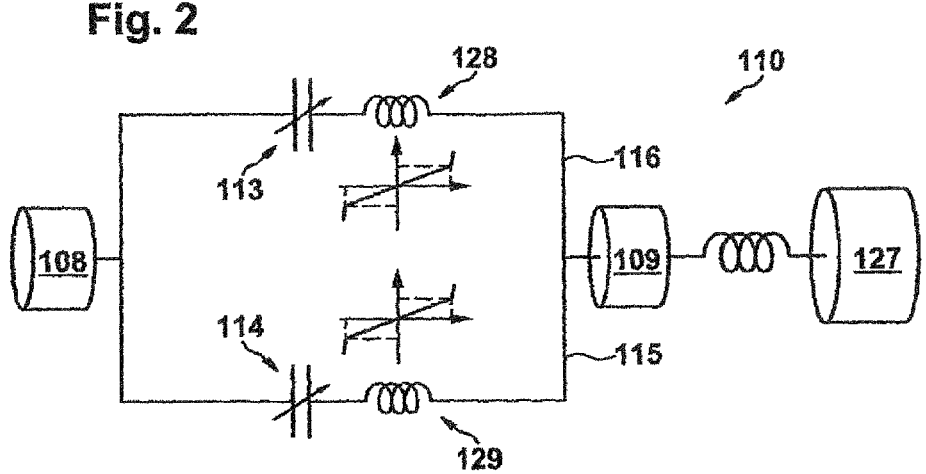
FIG. 2 shows a systematic representation of a drive train according to the invention.

In FIG. 2, for this purpose, a schematically represented drive train 110 is provided with an internal combustion engine 108, a dual clutch with the friction clutches 113, 114 and the parallel gear-shift transmission 109 with two torsional vibration dampers 128, 129 which is connected to the vehicle 127 via the conventional elastic means, said dampers being arranged in the torque path between the friction clutches 113, 114 and the transmission input shafts 115, 116, that is to say for example in the clutch plates (not shown). Here, the torsional vibration dampers 128, 129 are designed in such a way that the working range of an individual torsional vibration damper 128, 129 is smaller than the maximum torque of the internal combustion engine 108. In this way, the torsional vibration dampers 128, 129 can be set, with respect to their stiffness, to be soft enough that a vibration event occurring in particular during an overlapping shifting operation can be eliminated by means of an optimized damping or at least reduced to a degree which is no longer perceived to be uncomfortable. Here, the stiffness is dependent on the frequency of the vibration and its amplitude. Corresponding friction devices can be provided serially, parallel and/or with or without a clearance angle. It has been shown that in internal combustion engines 108 with a maximum torque of 250 Nm, a stiffness of about 40 Nm/° with respect to the angle of rotation of the input and output parts of the torsional vibration dampers 128, 128 may be advantageous. It may also be advantageous to design the stiffnesses of both torsional vibration dampers 128, 129 to be different, for example 70:30. If in the described type of design of the torsional vibration dampers 128, 129 one of the friction clutches 113, 114 is opened, thus does not transmit any torque, the torsional vibration damper 129, 128 assigned to the other friction clutch 114, 113 is fully compressed owing to its small working range at the stop and bridges the torque path from the associated friction clutch 114, 113 to the associated transmission input shaft 116, 115 without damping. The total capacity of the two torsional vibration dampers 128, 129 corresponds to the maximum torque of the internal combustion engine 108 or is greater, with the result that during an overlapping shifting operation at least one torsional vibration damper 128, 129 has a damping action while the other can be fully compressed.

Figure 3:
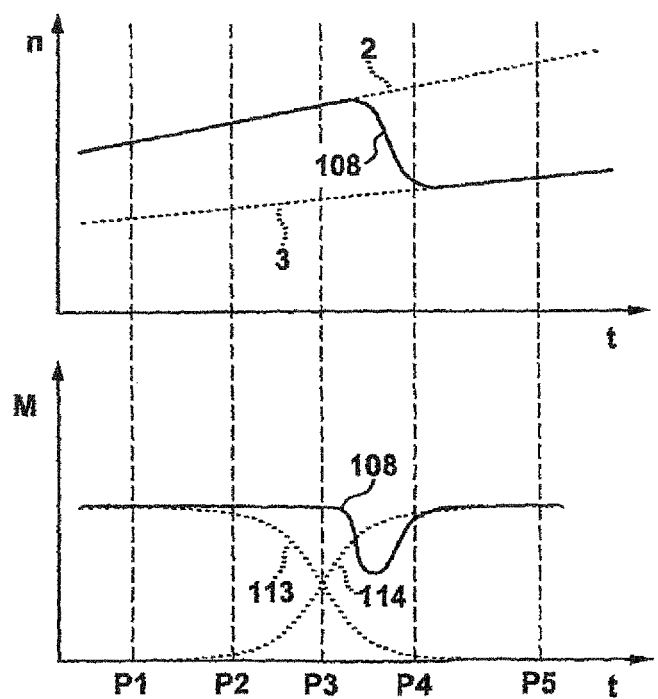
FIG. 3 shows a speed of rotation and torque diagram during an overlapping shifting operation.

For a fuller explanation of the possible operating ranges of the torsional vibration dampers 128, 129, use can be made of the diagrams and representations of FIGS. 3 and 4; the corresponding device features can be taken from FIG. 2. FIG. 3 shows in the upper region the rotational speed n of the internal combustion engine 108 and of the transmission input shafts with gears 2 and 3 engaged in the time window with the time t. The lower region represents the path of the torque NI of the internal combustion engine 108 and the torque M transmitted via the friction clutches 113, 114 with respect to the time t for the same shifting sequence. The vertical dashed lines represent, in predetermined time intervals, the phases P1, P2, P3, P4, P5 of the overlapping shifting operation. In FIG. 4, the individual phases P1, P2, P3, P4, P5 are assigned to the working ranges of the torsional vibration dampers 128, 129, wherein the indicated point in the schematically illustrated force/path representation indicates the working point of the torsional vibration dampers 128, 129. In the phases P1 and P5, in each case a single friction clutch 113, 114 transmits torque, that is to say that the torsional vibration damper 128 assigned to the friction clutch 113 and the transmission input shaft 116 is fully compressed, while in phase P5 the torsional vibration damper 129 is fully compressed when the friction clutch 114 is fully closed with gear 3 engaged. The two other torsional vibration dampers 129, 128 are in each case in the middle of their working range in the phases P1 and P5. In phase P2, the torsional vibration damper 128 leaves the fully compressed phase when the friction clutch 113 opens slowly; accordingly, as a result of the starting transmission torque at the friction clutch 114, the working point moves in respect of higher forces with larger path deflections. During the phase P3, the two friction clutches 113, 114 transmit the same torque, with the torsional vibration dampers 128, 129 therefore being situated approximately at the same working point. In phase P4, the friction clutch 114 is virtually opened, with the result that the working point of the torsional vibration damper 128 moves in the direction of a position of equilibrium and the working point of the torsional vibration damper 129 approaches the maximum deflection path. Phase P5 shows the end of the shifting operation with an open friction clutch 113 and torsional vibration dampers 128 situated in the unloaded working range and also a completely closed friction clutch 114 with bridged torsional vibration damper 129.

List of Reference Signs

| | |
|---|---|
| 1 | Gear |
| 2 | Gear |
| 3 | Gear |
| 4 | Gear |
| 5 | Gear |
| 6 | Gear |
| 7 | Gear |
| 8 | Internal combustion engine |
| 9 | Crankshaft |
| 10 | Drive train |
| 11 | Dual clutch |
| 12 | Two-mass flywheel |
| 13 | Friction clutch |
| 14 | Friction clutch |
| 15 | Transmission input shaft |
| 16 | Transmission input shaft |
| 17 | Clutch plate |
| 18 | Clutch plate |
| 19 | Parallel gear-shift transmission |
| 20 | Part shaft |
| 21 | Part shaft |
| 22 | Part shaft |
| 23 | Toothed wheel |
| 24 | Differential |
| 25 | Rolling bearing |
| 26 | Housing wall |

-continued

List of Reference Signs

| | |
|---|---|
| 108 | Internal combustion engine |
| 109 | Parallel gear-shift transmission |
| 110 | Drive train |
| 113 | Friction clutch |
| 114 | Friction clutch |
| 115 | Transmission input shaft |
| 116 | Transmission input shaft |
| 127 | Vehicle |
| 128 | Torsional vibration damper |
| 129 | Torsional vibration damper |
| R1 | Reverse gear |
| R2 | Pinion |
| n | Rotational speed |
| t | Time |
| P1 | Phase |
| P2 | Phase |
| P3 | Phase |
| P4 | Phase |
| P5 | Phase |
| M | Torque |

The invention claimed is:

1. A drive train, comprising:
an internal combustion engine having a crankshaft and a parallel gear-shift transmission with two part drive trains, each of the part drive trains having one transmission input shaft,
wherein one transmission input shaft is formed as a hollow shaft around the other transmission input shaft, and with a dual clutch which is received rotatably on the hollow shaft, is connected in a rotationally fixed manner to the crankshaft and has two friction clutches and two clutch plates which are assigned to, in each case, one clutch and are connected in a rotationally fixed manner to, in each case, one transmission input shaft,
wherein each clutch plate has a torsional vibration damper with a working range smaller than a maximum torque of the internal combustion engine so that the torsional vibration dampers eliminate or reduce vibration events that occur during an overlapping shifting operation, and
a further torsional vibration damper mounted between the crankshaft and the dual clutch.

2. The drive train of claim 1, wherein the working range of the torsional vibration damper arranged in the friction clutches is limited to half the maximum torque of the internal combustion engine.

3. The drive train of claim 1, wherein the torsional vibration damper is bridged during a transmission of a torque which exceeds the working range of a torsional vibration damper.

4. The drive train of claim 1, wherein the torque which is transmittable via the friction clutches is limited to a torque smaller than torque beaks generated by the internal combustion engine.

5. The drive train of claim 1, wherein stiffnesses of the torsional vibration dampers are designed to be different.

* * * * *